United States Patent [19]

Ernst et al.

[11] 4,206,951

[45] Jun. 10, 1980

[54] LINEAR ROLLING BEARING

[75] Inventors: Horst M. Ernst, Eltingshausen; Armin Olschewski; Lothar Walter, both of Schweinfurt; Manfred Brandenstein, Aschfeld, all of Fed. Rep. of Germany

[73] Assignee: SKF Kugellagerfabriken GmbH, Schweinfurt, Fed. Rep. of Germany

[21] Appl. No.: 9,956

[22] Filed: Feb. 6, 1979

Related U.S. Application Data

[63] Continuation of Ser. No. 783,066, Mar. 30, 1977, abandoned.

[30] Foreign Application Priority Data

Apr. 2, 1979 [DE] Fed. Rep. of Germany ....... 2614158

[51] Int. Cl.$^2$ ............................................. F16C 31/00
[52] U.S. Cl. ..................................... 308/6 C; 308/201
[58] Field of Search .............. 308/6 C, 6 R, 4 R, 199, 308/201; 29/148.4 R, 149.5 C; 64/23.7

[56] References Cited

U.S. PATENT DOCUMENTS 3,881,787  5/1975  Nilsson .............................. 308/6 C

FOREIGN PATENT DOCUMENTS 2558195  7/1976  Fed. Rep. of Germany .......... 308/6 C
494545  2/1976  U.S.S.R. ................................ 308/6 C

*Primary Examiner*—Lenard A. Footland
*Attorney, Agent, or Firm*—Daniel M. Rosen

[57] ABSTRACT

A linear rolling bearing has an outer housing with a central bore. A plurality of radially inwardly directed axially extending projections in the bore form races for rolling elements under load, and surfaces between the projections serve as return races. A cage within the bore has a plurality of axially extending guide channels, and semicircular guide channels interconnect pairs of the guide channels to form endless channels for the rolling elements. The outer housing has inclined surfaces joining the corresponding races for loaded and unloaded rolling elements, whereby the inclined surfaces steplessly interconnect the respective races and extend radially outwardly from each of these races.

6 Claims, 5 Drawing Figures

PRIOR ART

LINEAR ROLLING BEARING

This is a continuation of application Ser. No. 783,066, filed Mar. 30, 1977, now abandoned.

This invention relates to linear rolling bearings, that is, bearings of the type having rolling elements and adapted to move, for example, axially along a shaft. The invention is particularly directed to this type of bearing having an outer housing with a bore, wherein several axially extending projections are distributed about the circumference in the boring, to form races for balls under load. This type of bearing further has a ball cage arranged within the ball housing, the cage having a number of rectilinear and axially extending guide channels distributed about its circumference, the guide channels being interconnected with one another in pairs by semicircular turning channels, whereby endless ball channels are formed in the bearing structure.

Many embodiments of linear bearings of this type are known. In one of the known arrangements, the projections for the races of the balls under load are preferably formed by stamping. As a result, the axial ends of the projections are essentially in the form of frustums of pyramids, with the smaller bases of the frustums of the pyramids forming axial extensions and being in the planes of the projections. The larger bases of the pyramids are essentially in the planes of the return races. In this structure, as will be more clearly explained with reference to FIG. 4, in order to reduce to a minimum, or to completely avoid the vibration of the balls due to collisions therebetween, as well as by the running of the balls onto and off of the projections, the straight course portions of the ball races in the cage are of about the same length as the ball races of the outer housing, and the curved race portions of the cages are positioned to enable the balls to run onto and off the projections at corresponding corner point regions of the base surface of the projections. Such a structure is disclosed, for example, in German Pat. No. 1,916,164.

This known arrangement guarantees the optimum race proportions for the turning of the balls in the shortest axial space. Continuous turning of the balls does not occur in this arrangement. Due to the relatively high speeds which exist in the return zone, the balls are urged strongly outwardly before they ascend the ramp, since the balls endeavor to run further in the same plane. At the apex of the semicircular turning zone a state of inertia also occurs, so that the balls are acted upon by forces at the apex which exerts a blocking pressure on the next following balls in the return channel. This condition of the balls result in strong wear at the apex point of the turning zone, as well as on both sides of the channel, due to the blocking and sideward press from the balls. This same phenomenon occurs also on the sides of the ball housing, in which the balls are fed from the races and turned to be directed in the return paths. As a result, extensive wear occurs in the end region of the races.

The present invention is therefore directed to the provision of a linear rolling bearing of the above type, having the optimum race length while simultaneously avoiding the wear and destruction in the turning zone.

Briefly stated, in accordance with the invention, a linear rolling bearing is comprised of an outer housing having a central bore. The ends of the corresponding return races and races under load are interconnected smoothly by inclined surfaces which extend radially outwardly from each of the return and loaded bearing races in the region of the semicircular guide channels. According to a preferred embodiment of the invention, the inclined surfaces may be comprised of a single annular groove at each end of the outer housing in the bore thereof, the grooves having inclined side surfaces which extend radially outwardly in the direction toward the ends of the bearing.

In order that the invention will be more clearly understood, it will now be disclosed in greater detail with reference to the accompanying drawings, wherein.

Figure 1:
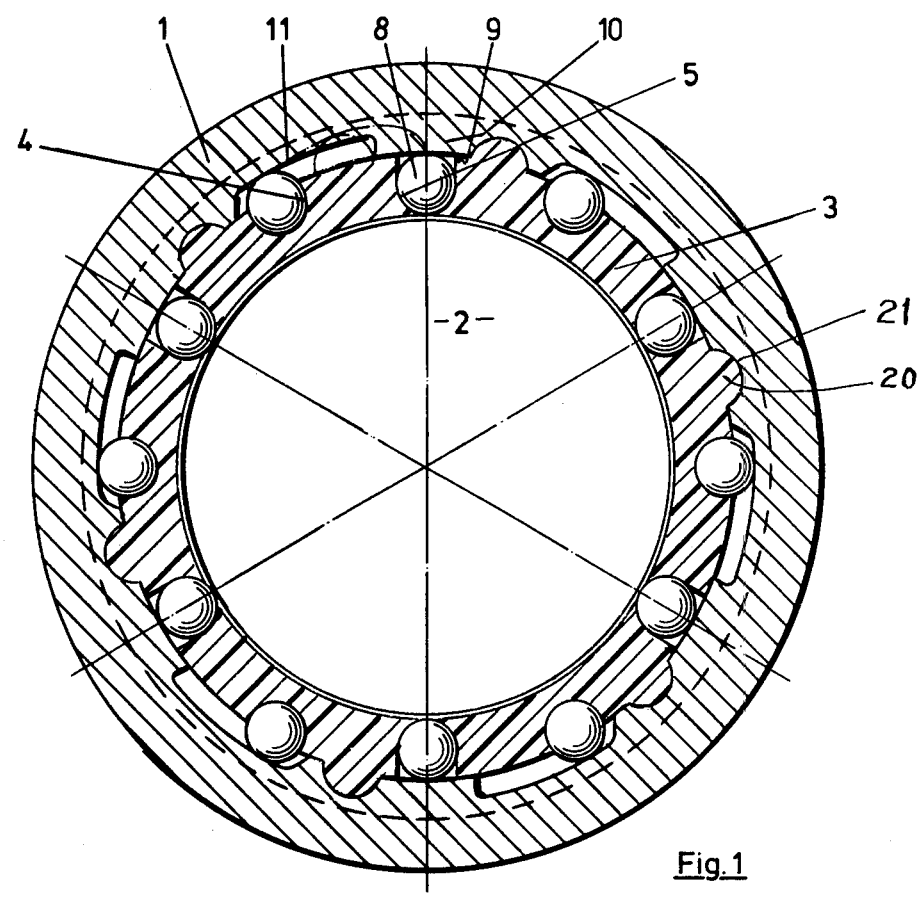
FIG. 1 is a cross-section view of a linear rolling bearing in accordance with the invention.

Referring now to FIG. 1, therein is illustrated a linear rolling bearing comprised of an outer housing 1, a shaft 2 upon which the linear bearing is adapted to move in the axial direction, and an intermediate cage 3 for holding rolling elements, such as the balls 8. The outer housing 1 is generally cylindrical, and has a plurality of axially extending radially inwardly directed projections 10 distributed about the circumference of the central bore therein. The projections 10 form races for the rolling elements, that is, the balls 8, under load. The axially extending surfaces of the interior of the inner housing between the projections 10 form return races 11 for balls which are not under load.

The ball cage 3 has axially extending guide channels 5 for balls under load, the guide channels 5 being radially aligned with the projections 10 and being open radially inwardly. In addition, the ball cage 3 has axially extending guide channels 4 open radially outwardly, for guiding balls in the return channels. The inner surfaces 9 of the projections 10 thereby engage the balls 8 in the loaded channels, to enable linear movement of the bearing along the shaft 2.

As is apparent from FIG. 1, the cage 3 may further have axially extending projections 20 in its outer surface extending into corresponding grooves 21, for example, in the projections 10, in order to inhibit relative rotation between the cage and the outer housing 1.

Figure 2:
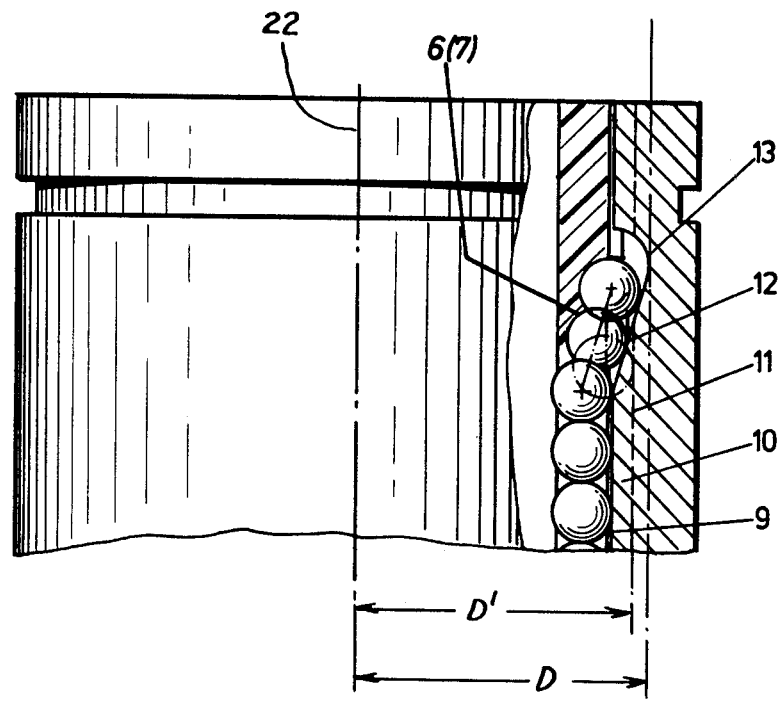
FIG. 2 is a partially cross-sectional view of a portion of the side of the linear rolling bearing of FIG. 1.

As illustrated in FIG. 2, the guide channels 4 and 5 are interconnected in pairs by semicircular turning channels 6 at one end of the bearing, and by similar turning channels 7 at the other end of the bearing, in order to form endless rows of ball bearings 8. As a consequence, as the linear rolling bearing is moved along the shaft 2, balls 8 are directed in one direction through a loaded channel, and in the opposite direction through the corresponding return channel, to result in the continuous movement of the balls in the corresponding guide channels, with the movement of the balls in the return channel being opposite to the movement direction of the bearing. Since the balls in the return channels are radially spaced from the shaft, the return races 11 have larger diameters, with respect to the bore of the outer housing, than the races 9 on the projections 10.

Figure 3:
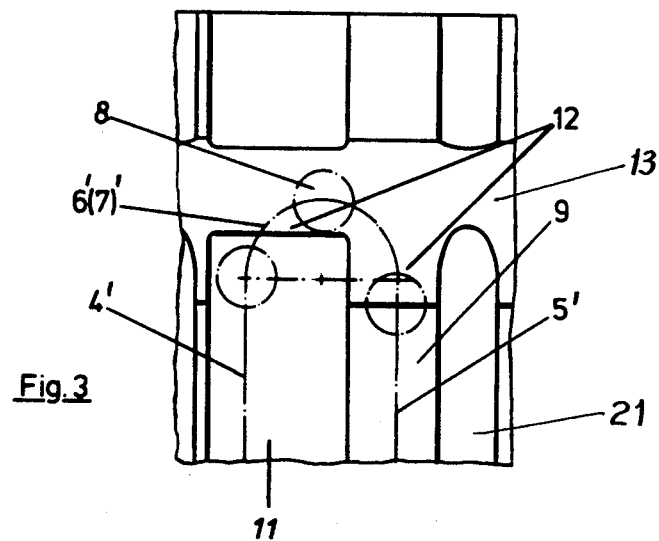
FIG. 3 is a rolled out view of the inner end portion of the outer housing of FIG. 1, illustrating the end section of the load and return races and the interconnecting surfaces of the outer housing.

According to the invention, in the boring of the outer housing 1 at both ends thereof, in the region of the semicircular turning channels 6 and 7, a widened inclined surface 12 is provided interconnecting the corresponding return races 11 and races 9 under load. The surfaces 12 pass over to the surfaces of the races in the outer housing without steps. In the illustrated example of the invention, the inclined surfaces may be formed by a single annular groove 13 at each end of the bearing in the outer housing, the groove having surfaces inclined to the axis of the bearing. This is illustrated, for example, in FIG. 3. The bottom of the annular groove 13, that is, the radially outermost portion of this groove, has a diameter which is greater than the diametric distance between opposite return races 11, as is apparent in FIG. 2. In other words, the distance D between the axis 22 of the bearing and the bottom of the groove 13 is greater than the diametric distance D' between the axis 22 and the return race 11. Furthermore, the groove 13 is wider than the return channel 6. The inclined surface 12 is parallel to the inclined surface of the semicircular channels in the cage 3. Essentially all of the turning of the balls occur on the ramps or inclined surfaces 12. The structure of the present invention is perhaps more clearly seen in FIG. 3, wherein the course of the balls in the straight lowered guide channel 5 is illustrated by the line 5', the course of the balls in the return guide channel 4 is illustrated by the line 4', and the course of the balls as directed by the semicircular channel 6, 7 is denoted by the semicircular lines 6' (7'). In this figure, in accordance with the invention, it is evident that the inclined surface 12 formed by the groove 13 intersects the return race 11 along a transverse plane to one side of the ends of the semicircular guide path, and the opening in the guide channel 5 terminates smoothly in the inclined surface 12 in a transverse plane on the opposite side of the semicircular guide channel. Consequently, balls passing from the return channels 4 into the semicircular turning channel are turned in the circumferential direction of the bearing before they are directed radially along the inclined surfaces 12. Further, balls proceeding in the channels 5 under load are directed onto the inclined surface 12 to move in the axial direction before they begin to be directed circumferentially by the semicircular turning channel. In addition, as is evident from FIGS. 2 and 3 balls directed from the return channels, as well as from the channel under load, onto the inclined surfaces are both directed radially outwardly along the inclined surfaces 12 until the apex of the turning channel is reached. This arrangement has the advantage that the balls from the semicircular turning channels are directed in the axial running direction to the channels under load, before a load is applied thereto. As a consequence, contrary to known construction, wear due to friction on the balls is avoided. The insignificant shortening of the carrying length of the race thereby is substantially without influence on the carrying capacity of the bearing.

Figure 4:
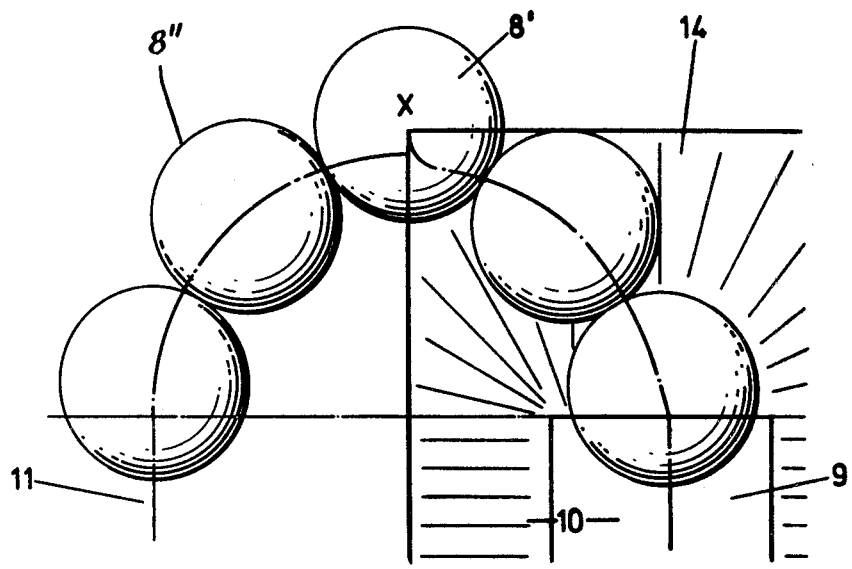
FIG. 4 is a simplified illustration, in rolled out form, of the construction of the cage portion of a linear rolling bearing in accordance with the prior art.
Figure 5:
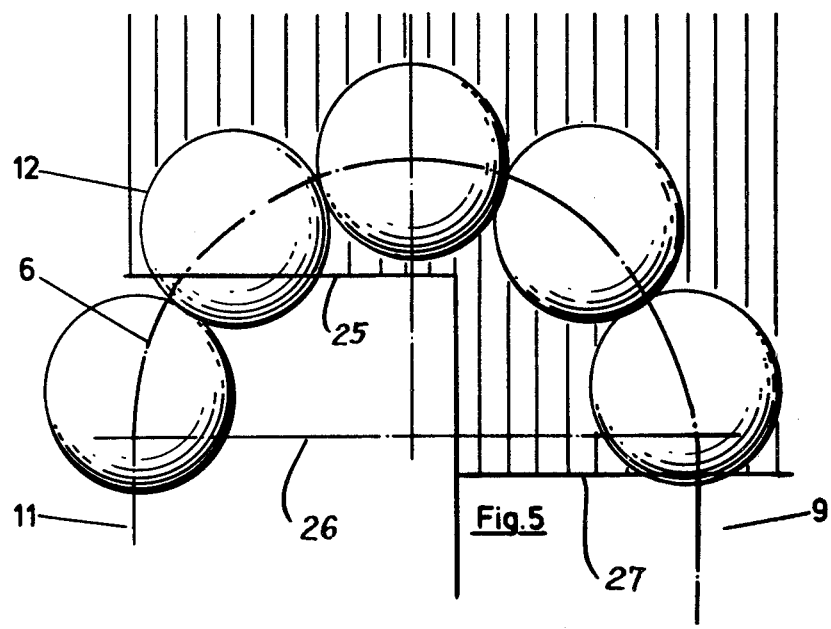
FIG. 5 is a simplified illustration, in rolled out form of an end portion of the cage of the present invention corresponding to the illustration of FIG. 4.

A comparison of the arrangement of the present invention with the prior art is more clearly evident with reference to FIGS. 4 and 5, which illustrate respectively, "rolled out" sections of the ends of the prior art bearing and the bearing of the present invention, in simplified form.

Referring now to FIG. 4, in the bearing structure of the prior art, a single race 14 connects the return race 11 to the race 9 on the projection 10. As is apparent in FIG. 4, the projection 10 at the end of the race 9 has the general appearance of a frustum of a pyramid, the major base of the pyramid being at the same level in the bearing as the return race, and one corner X of the pyramid lies at the apex of the semicircular channel. In this arrangement, the half of the semicircular channel connected to the return channel 11 is at the same level in the bearing as the return channel 11, whereby radial, as well as turning movements, are effected along the ramp 14. Balls coming from the return race 11 have a high speed. This forces the lead ball 8' axially outwardly, before it can begin to "climb" the ramp 14. The ball, however, has inertia, so that it tends to run further at the same level. At the point X the ball then has a tendency to remain at this level, so that in addition to strongly abrading the wall of the semicircular channel, the ball 8' also tends to impede the forward progress of the next following ball 8". The balls are thereby alternately pressed against both sides of the edge of the return race 11 and leave impressions therein. This effect is detrimental, of course, for the frictionless and noise-free running of the balls in the races. In a similar manner, the races are worn by balls directed in the opposite direction, that is, proceeding at a high speed from the race 9 under load. In this case also the balls have inertia so that they tend to run at the same level at the corresponding race. The beginning of the ramp 14, at the end of the race 9, is thereby worn and abraded due to the braking action of the balls on this ramp.

FIG. 5 shows the basic structure in accordance with the invention, wherein the inclined surface 12 intersects the return race 11 along a ling 25 to one side of the plane 26 defining the ends of the semicircular channel, and the inclined plane 12 intersects the channel 9 for balls under load along line 27, a line on the other side of the plane 26 defining the ends of the semicircular channel. As a consequence, it is apparent that balls proceeding onto the inclined surface 12 from either of the two races initially is directed radially outwardly toward the end of the bearing. Further, in the channel for balls under load, the change in radial movement occurs prior to the turning of the balls by the semicircular channel, whereas balls proceeding from the channel 11 onto the inclined surface first begin to turn before they engage the inclined surface 12. The balls, however, are always initially directed radially outwardly, with respect to the channel from which they are directed.

Thus, balls 8 coming from a return race are directed, after entering the turning course 6, but at the same height in a curved course. After a shorter stretch than in the arrangement of the prior art, these balls are directed onto the inclined surface, and the balls are then directed continuously steplessly to increasing diameters with respect to the bearing. At the apex of the semicircular channel, the balls are then led in a continuous stepless incline to the race 9 for the balls under load. As a consequence, a continuous circulation of the balls occurs in the turning zone, and the discontinuous passage of the balls and the consequent blocking and delaying of the balls is minimized or prevented. As a result, wear on the bearing structure is minimized.

While the invention has been disclosed and described with reference to a single embodiment, it will be apparent that variations and modifications may be made therein, and it is therefore intended in the following claims to cover each such variation as falls within the true spirit and scope of the invention.

What is claimed is:

1. In a linear rolling bearing having an outer housing with a central bore, a plurality of radially inwardly directed axially extending projections distributed on said housing within said bore, a cage within said bore and having a plurality of axially extending guide channels distributed about its circumference, and semicircular channels interconnecting pairs of guide channels to form endless channels, and rolling elements in said endless channels, whereby one guide channel of each pair directs rolling elements under load, said projections form load carrying races for said rolling elements under load and said outer housing has axially extending inner surfaces forming return races for rolling elements that are not under load, said cage holding said elements in the other guide channel of each pair from contacting surfaces radially inwardly of said bearing; the improvement wherein said housing further has an inclined surface joining the corresponding pairs of races for loaded and unloaded rolling elements at each end thereof of said bearing in the region of said semicircular channels, said inclined surfaces extending steplessly radially outwardly from the respective load carrying and return channels and being comprised of annular grooves at each end of said outer housing in the bore thereof and having inclined side surfaces which extend radially outwardly in the direction toward the axial ends of said bearing, the axial inward ends of said inclined surfaces intersecting said return races at each end thereof axially outwardly of the transverse plane at the respective ends of said semicircular channels, with respect to the lengthwise direction of said bearing, the inner diameter of said outer housing at the bottom of said grooves being greater than the inner diameter of said outer housing at said return races.

2. The bearing of claim 1, wherein said groove is wider in the axial direction than said semicircular channels.

3. The bearing of claim 1, wherein said inclined surface intersects the load carrying channels axially inwardly of the transverse plane defining the ends of said semicircular channels, with respect to the center of said bearing.

4. In a linear rolling bearing having an outer housing with a central bore, a cage within said bore defining a plurality of axially extending guide channels distributed about its circumference and semicircular guide channels joining pairs of axially extending guide channels to form endless channels, rolling elements in said endless channels, axially extending surfaces on said housing extending radially inward to form load carrying first races for rolling elements in a first guide channel of each pair, whereby further axially extending surfaces in said bore aligned with the second guide channels of each pair define second races for unloaded rolling elements; the improvement comprising ramp means on said bore for directing rolling elements entering said semicircular guide channels radially outwardly from said first and second guide channels, and a surface in said bore that is inclined to the axis of said bore and joins the end of the respective pairs of first and second guide races, said inclined surfaces comprising single annular grooves at each end of said outer housing in the bore thereof and having inclined side surfaces which extend radially outwardly in the axial outward direction of said bearing, said inclined surfaces intersecting said second races at regions of said semicircular channels to permit rolling elements entering said semicircular channels from said second guide channels to commence stepless radial outward movement after said elements have entered said circular channels but before said elements had proceeded halfway around said semicircular channels toward said first guide channels, the inner diameter of said outer housing at the bottom of said grooves being greater than the inner diameter of said outer housing at said return races.

5. The linear rolling element of claim 4, wherein said grooves intersect said first races axially inward of said semicircular channels.

6. The linear rolling bearing of claim 4, comprising means for inhibiting relative rotation between said housing and said cage.

* * * * *

UNITED STATES PATENT AND TRADEMARK OFFICE
CERTIFICATE OF CORRECTION

PATENT NO. : 4,206,951

DATED : June 10, 1980

INVENTOR(S) : Horst M. Ernst et al

It is certified that error appears in the above–identified patent and that said Letters Patent are hereby corrected as shown below:

On the Title page, under Foreign Application Priority Data omit "April 2, 1979" and insert -- April 2, 1976 --.

*Signed and Sealed this*

*Thirtieth* Day of *December 1980*

[SEAL]

Attest:

SIDNEY A. DIAMOND

*Attesting Officer*  *Commissioner of Patents and Trademarks*